United States Patent
Chaney et al.

(10) Patent No.: US 8,230,959 B2
(45) Date of Patent: *Jul. 31, 2012

(54) FOLDING AIR INTAKE SCOOP (75) Inventors: Mark Michael Chaney, Geneseo, IL (US); Brian Joseph Maas, Bettendorf, IA (US)

(73) Assignee: Deere & Company, Moline, IL (US)

( * ) Notice: Subject to any disclaimer, the term of this patent is extended or adjusted under 35 U.S.C. 154(b) by 649 days.

This patent is subject to a terminal disclaimer.

(21) Appl. No.: 11/991,274

(22) PCT Filed: Sep. 2, 2005

(86) PCT No.: PCT/US2005/031370
§ 371 (c)(1),
(2), (4) Date: Aug. 21, 2009

(87) PCT Pub. No.: WO2007/030097
PCT Pub. Date: Mar. 15, 2007

(65) Prior Publication Data
US 2010/0012413 A1    Jan. 21, 2010

(51) Int. Cl.
*B60K 13/02*    (2006.01)
(52) U.S. Cl. ........... 180/68.3; 180/68.1; 180/68.2
(58) Field of Classification Search ......... 180/68.3, 180/68.1, 68.2; 123/198 E, 41.11, 41.01, 123/41.49; 55/385.3, 283, 294, 301, 332, 55/357; 454/139, 161
See application file for complete search history.

(56) References Cited

U.S. PATENT DOCUMENTS

| | | | | | |
|---|---|---|---|---|---|
| 2,627,218 | A | * | 2/1953 | Katz | 454/139 |
| 3,481,119 | A | * | 12/1969 | McKinlay | 180/68.3 |
| 3,636,684 | A | * | 1/1972 | Vogelaar et al. | 55/332 |
| 4,140,047 | A | * | 2/1979 | Bowman et al. | 55/357 |
| 5,251,712 | A | * | 10/1993 | Hayashi et al. | 180/68.3 |
| 5,944,603 | A | * | 8/1999 | Guinn et al. | 55/385.3 |
| 6,193,772 | B1 | * | 2/2001 | Wiefel | 55/283 |
| 6,220,207 | B1 | * | 4/2001 | Kawasaki et al. | 123/41.11 |
| 6,321,830 | B1 | * | 11/2001 | Steinmann | 123/41.01 |
| 7,507,270 | B2 | * | 3/2009 | Maas et al. | 123/198 E |

FOREIGN PATENT DOCUMENTS

| | | |
|---|---|---|
| SU | 622701 A1 | 9/1978 |
| SU | 729098 A1 | 4/1980 |
| SU | 1014509 A | 4/1983 |
| SU | 1042658 A | 9/1983 |

OTHER PUBLICATIONS

Kazakhstan Official Action dated May 19, 2010 (2 pages).

* cited by examiner

*Primary Examiner* — Hau Phan (57) ABSTRACT

A working vehicle has a body, an internal combustion engine in an engine compartment in the vehicle body; and an air scoop having an inlet positioned near a top of the vehicle body and facing in an upward direction, the air scoop pivotable between a first closed, transport position, and a second open, operating position for directing air into the engine compartment when the air scoop is in the open, operating position.

14 Claims, 7 Drawing Sheets

Fig. 6

FOLDING AIR INTAKE SCOOP

FIELD OF THE INVENTION

The present invention relates a body panel for an agricultural or construction vehicle, and particularly to a body panel used for directing airflow into the vehicle engine compartment that can be opened for operational use, and folded for shipping and transport purposes to reduce vehicle body dimensions.

BACKGROUND OF THE INVENTION

Agricultural and construction vehicles are typically powered by internal combustion engines. Typically, these vehicles are used in environments that are dirty, and the air contains dust and other particulate matter. Agricultural vehicles also work in environments where crop residue, as well as dirt and particulate matter are in the air. During operation, air is drawn into the engine compartment for cooling the engine, and for efficient combustion in the internal combustion engine (ICE). More particularly, the air supply must be free of particulate matter. In harvesting/construction environments, this generally requires an air filtration and/or cleaning system so the air being pulled in can be cleaned sufficiently so that it can be utilized for engine combustion or cooling. Even with such filtration/cleaning systems, particulate matter, dirt and/or crop residue can block, or partially block the air intake systems, resulting in the need for the system to be cleaned at frequent intervals.

There is a continuing need for systems that can improve air cleaning and filtering with less frequent need for cleaning of the equipment. One solution is to move the air intake location to an area of the vehicle that is further away from the dirt/residue stirred up by the vehicle. However, as vehicles have grown ever larger, constraints on vehicle sizes have been imposed by the size of shipping containers or the width of transportation systems (i.e. roads, railway beds) used for moving such vehicles. Thus there is a limitation on vehicle size that limits the ability to move the air intake area too far away from the body of the vehicle.

SUMMARY OF THE INVENTION

The present invention provides an air scoop having an inlet positioned above the vehicle body to draw cleaner air through the air intake systems. The air intake scoop is configured so that it can be folded for transport purposes, when the vehicle does not require air intake, and can be easily secured into an open position for use when the vehicle is in operation.

The present invention includes an air scoop that has an inlet positioned near the top of the vehicle body and facing in an upward direction, so that air being drawn into the engine and cooling systems is cleaner than air drawn in from a lower area on the vehicle, closer to the work area, would be. The air scoop of the present invention is also configured so that it can be easily folded in flush to the body of the vehicle for transport purposes, thereby reducing the overall width of the vehicle when the air scoop is folded. The invention comprises, in another form thereof, a vehicle including an internal combustion engine having an engine housing at least partially enclosing the internal combustion engine. An air scoop has an inlet positioned above the engine housing and facing in an upward direction, and an outlet positioned in fluid communication with the engine housing and facing toward the heat exchanger.

DETAILED DESCRIPTION OF THE INVENTION

Figure 1:
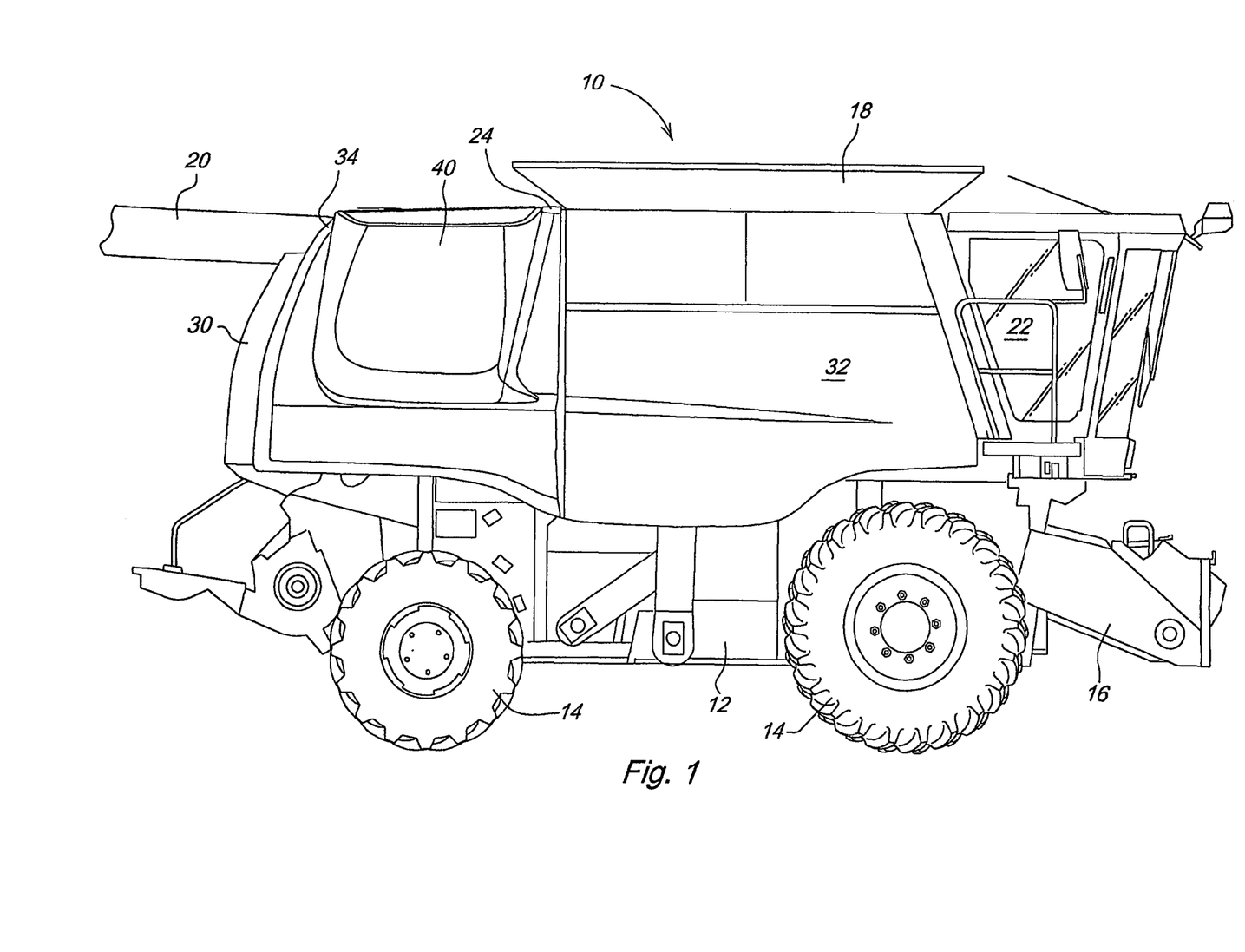
FIG. 1 is a side view of an agricultural combine having the foldable air scoop of the present invention.

Referring now to the drawings, and more particularly to FIG. 1, there is shown a working vehicle in the form of an agricultural harvesting machine, such as an agricultural combine 10. The working vehicle can also be in the form of a different type of vehicle used in a dirty or debris-laden operating environment, such as an agricultural tractor, construction equipment, forestry equipment, etc.

Combine 10 includes a supporting structure or body 12 having ground engaging wheels 14 extending from body 12. Although combine 10 is illustrated as having wheels 14, it could also have ground engaging tracks, either full tracks or half tracks. The combine 12 also has a feeder house 16 through which harvested crop material is fed into the combine 10 for processing. Once processed, the harvested crop material is stored in a grain tank 18 in the combine 10 and unloaded from the combine 10 through an unloading auger 20. The operation of combine 10 is controlled from an operator's cab 22.

Figure 2:
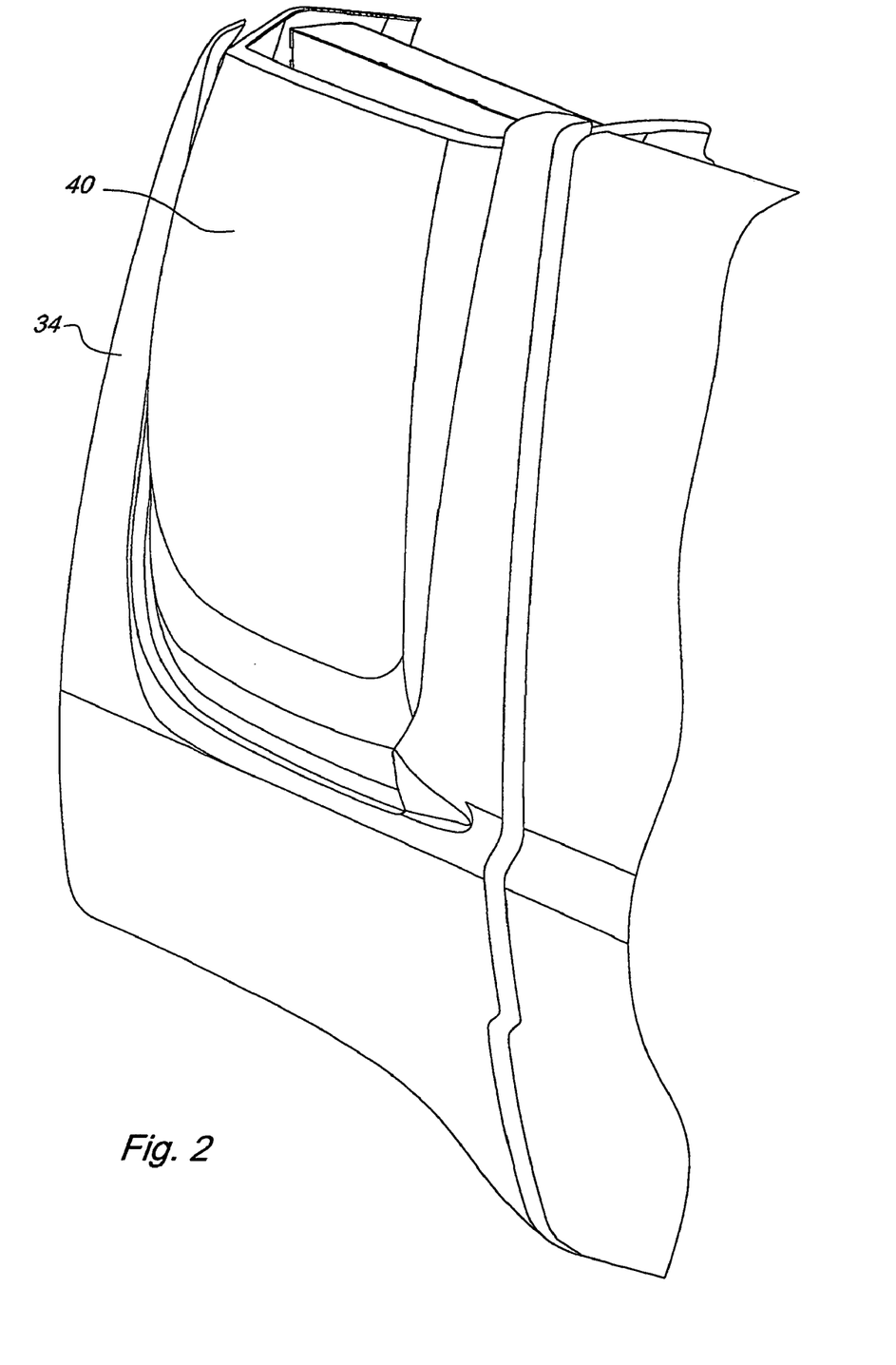
FIG. 2 is a side, perspective view of the combine with the air scoop in the closed, shipping position.
Figure 3:
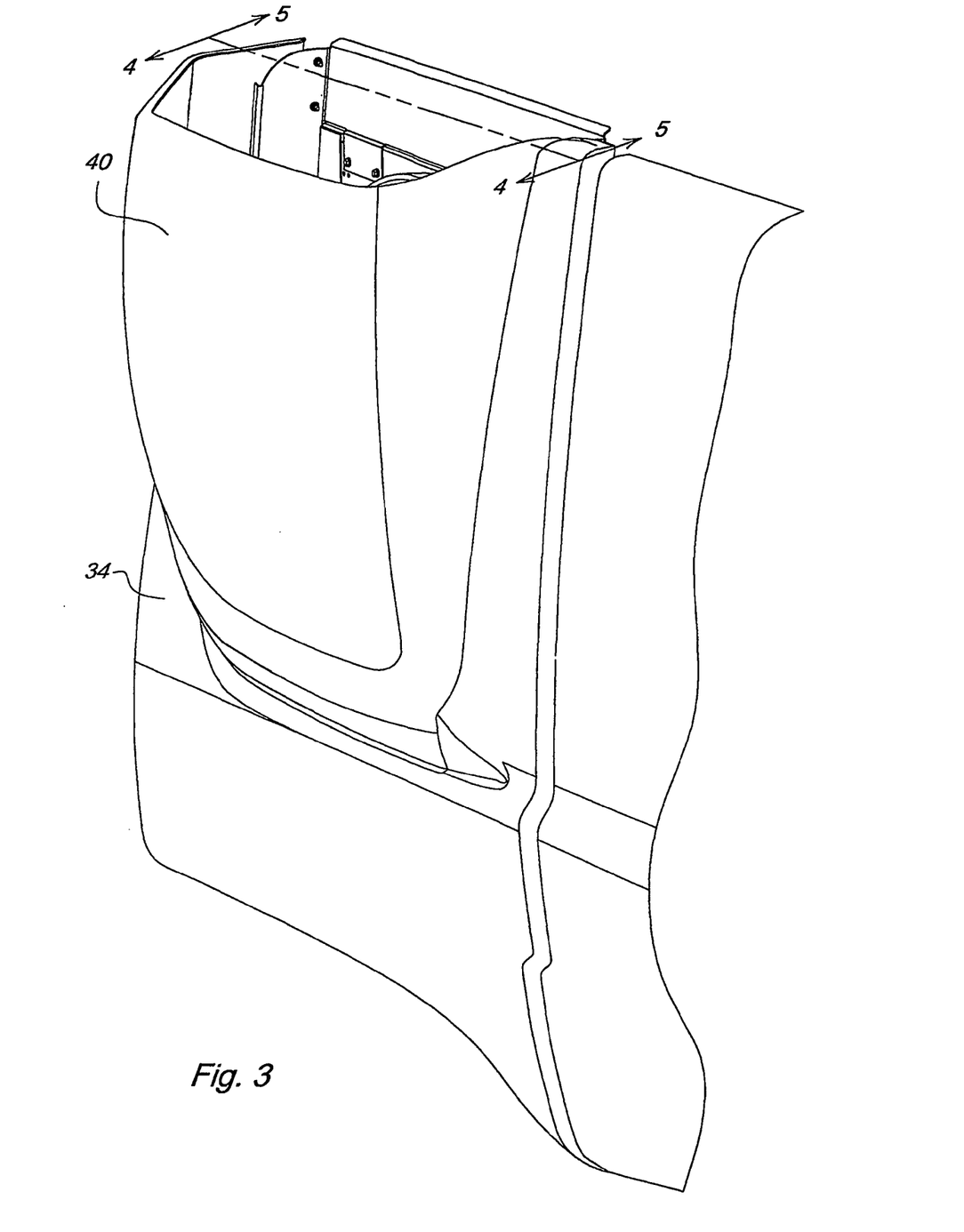
FIG. 3 is a side, perspective view of the combine with the air scoop in the open, operational position.

Mechanical power for combine 10 is provided by an internal combustion engine (not shown) contained in an engine compartment 24 in the rear portion of the combine 12. A radiator (not shown) in the engine compartment 24 is used for circulating cooling fluid through the internal combustion engine. The combine 10 has a number of body panels surrounding the sides and rear of the combine, including, but not limited to: a rear panel 30, left side panels (not shown), right side panel 32, and radiator door panel 34, adjacent to the area of the engine compartment 24 where the radiator is located, the radiator door panel 34 having a foldable air scoop 40. The air scoop 40 is movable between a closed shipping position, as shown in FIG. 2, and an open, operating position, as shown in FIG. 3. When the air scoop 40 is in the closed position, the combine profile is narrower than when the air scoop 40 is in the open position, providing for ease of transport of the combine 10, especially when moving the combine 10 through confined spaces, or narrow roadways or rail beds, or shipping in a container of limited size.

Figure 4:
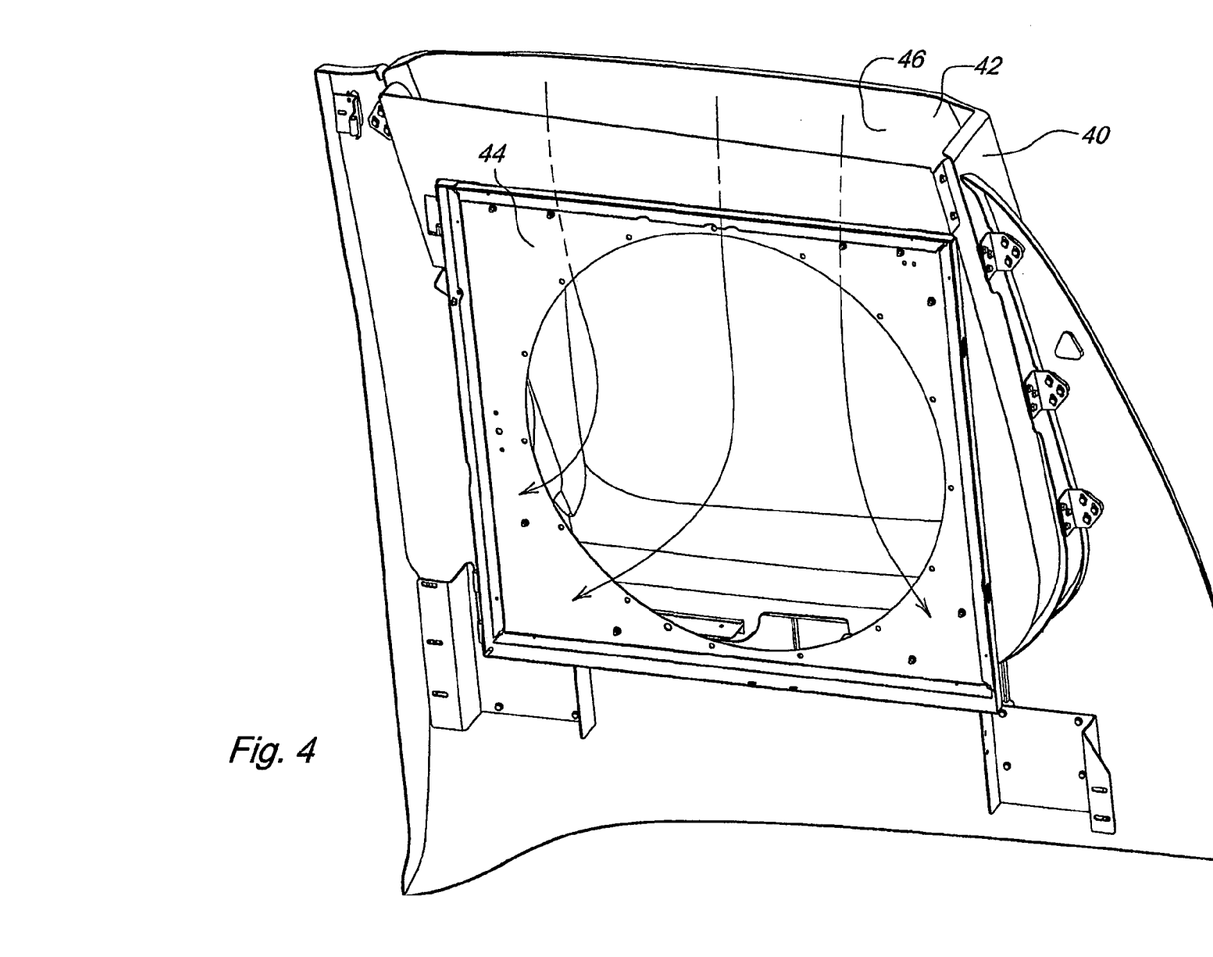
FIG. 4 is a partial interior view of the radiator door panel showing the radiator door panel and rotary screen to which the foldable air scoop pivot is secured, taken along line 4-4 of FIG. 3.

The air scoop 40 is positioned adjacent to and external of a rotary screen 44, shown in FIG. 4, which is used to filter air being drawn in to the engine compartment 24. Air scoop 40 has an inlet 42, which is positioned above the engine compartment 24. Typically, dirt and debris-laden air which is stirred up by the equipment when in operation will rise to several feet above ground level. By positioning air scoop inlet 42 above the height of combine 10 and facing air scoop inlet 42 in an upward direction, the air which is drawn into the engine is substantially cleaner. This in turn reduces the amount of foreign matter which must be screened and filtered from the incoming air through the rotary screen 44.

Air scoop 40 has a generally L-shaped flow path defined by outer wall 46 extending from inlet 42 along the length of the outer wall 46 and into the front of the rotary screen 44. The L-shaped flow path directs the incoming air from a generally vertically downward direction to a generally horizontal direction entering rotary screen 44. Air scoop 40 is positioned in association with rotary screen 44 such that a sufficient flow of air flows through the rotary screen 44 and into the engine compartment 24. In the embodiment shown, air scoop 40 has a generally U-shaped cross-section, approximating the width of rotary screen 44. The curved transition in outer wall 46 of air scoop 40 between inlet 42 and the area of the air scoop 40 adjacent to the rotary screen 44 redirects the air in the horizontal direction to rotary screen 44 without substantial restriction.

With a conventional combine using a louvered panel (not shown) on the outside of rotary screen 44, a strong cross-wind blowing into rotary screen 44 can create air currents, which can result in removal of foreign matter by rotary screen 44 that is less than optimal. In the present invention, because the outer wall 46 of air scoop 40 covers rotary screen 44 in a horizontal direction, a strong cross-wind is deflected by the air scoop 40, and does not deleteriously affect the performance of rotary screen 44.

During operation, air is drawn through air scoop 40 and is diverted from a vertically downward direction to a horizontal direction entering rotary screen 44 by the inside shape of outer wall 46. The air is substantially cleaner since air scoop inlet 42 opens in an upward direction at or above combine 10.

Figure 5:
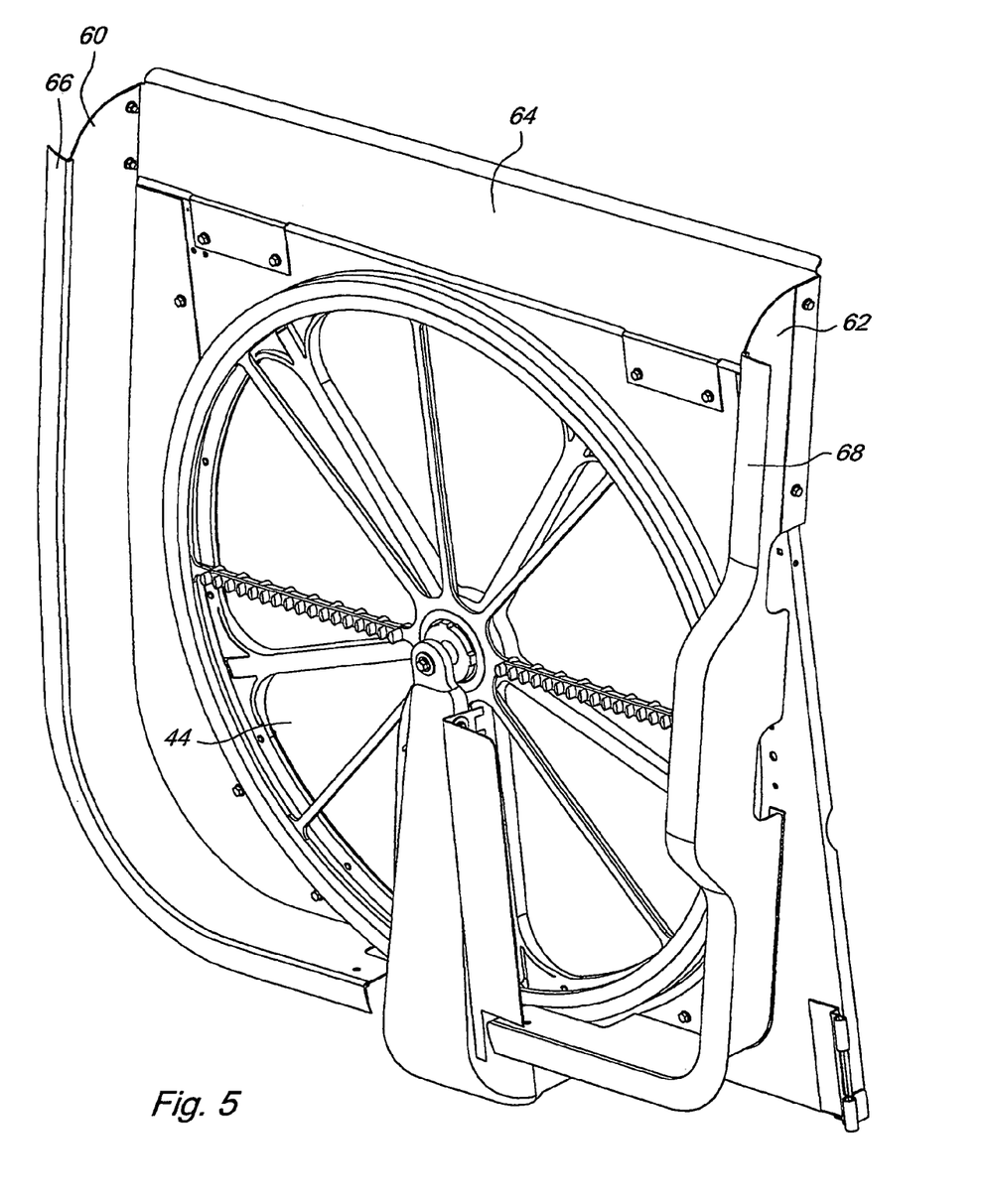
FIG. 5 is a partial interior view of the rotary screen, cowling, and seals from inside the foldable air scoop, taken along line 5-5 of FIG. 3.

To further limit the dust and dirt that enter the engine compartment 24, a cowling and seals are used to seal the areas around the outside of the air scoop 40 and the rotary screen 44. FIG. 5 shows the cowling pieces and seals in greater detail. The cowling is comprised of three pieces: a left side piece 60, a right side piece 62, and a top portion 64. A seal 66 is secured to the front edge of the left side piece 60 to limit egress of dirt and debris around the left side of the air scoop 40 where the cowling 62 and seal 66 contact the left side edge of the air scoop 40. A seal 68 provides similar protection where the right side piece 62 contacts the right side edge of air scoop 40. When the air scoop 40 is in the closed shipping position, as shown in FIG. 2, the cowling 60, 62, 64, and attached seals 66, 68, are removed and stored in the grain tank 18. When the air scoop is opened for use, the cowling 60, 62, 64 and attached seals 66, 68 are reinstalled.

Figure 6:
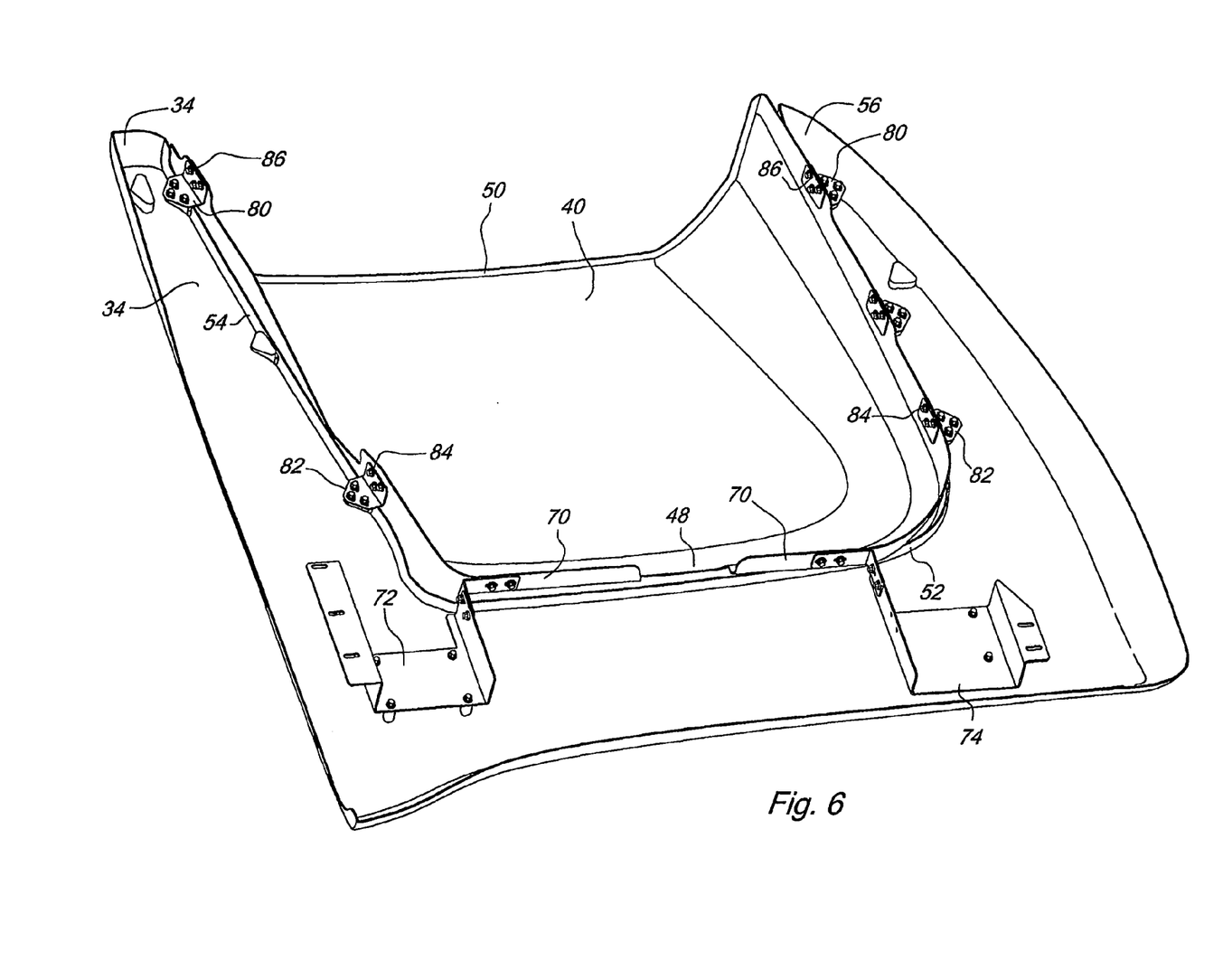
FIG. 6 is a partial interior view as in FIG. 4, with the rotary screen removed.

FIG. 6 shows the air scoop 40 assembled to the radiator door panel 34. Two brackets 72, 74, are formed from or secured to the inside of the radiator door panel 34. Pivots 70 are affixed to the bottom edge of the air scoop 40, and secured to each bracket 72, 74. The air scoop 40 is movable between the closed position shown in FIG. 2 and the open, operating position shown in FIG. 3 by pivotable outward rotation of the air scoop 40 about a horizontal axis adjacent the bottom edge 48 of the air scoop 40 by means of rotation of the pivots 70. The top edge 50 of the air scoop 40 pivots outward to open the air scoop 40. The radiator door panel 34 is configured to enclose the air scoop on left, right and bottom edges of the air scoop 40. The radiator door panel 34 has a first edge portion 52, the inside of which overlaps the outer side of the lower edge 48 of the air scoop 40, a second edge portion 54 which overlaps the outer side of the right side of the air scoop 40 and a third edge portion 56 which overlaps the outer side of the left side of the air scoop 40 to provide three enclosed edges of the air scoop 40 to control air flow around these three sides of the air scoop 40 and present a finished appearance to the vehicle.

When the air scoop 40 is in its open position, bosses 80, 82 attached to the left and right sides of the radiator door panel 34, are secured by securing means to through-material holes 84, 86 on the left and right sides edges 54, 56 of the air scoop 40. These bosses 80, 82, in conjunction with the pivots 70 provide support for the air scoop 40 when it is in the open, operating position.

Figure 7:
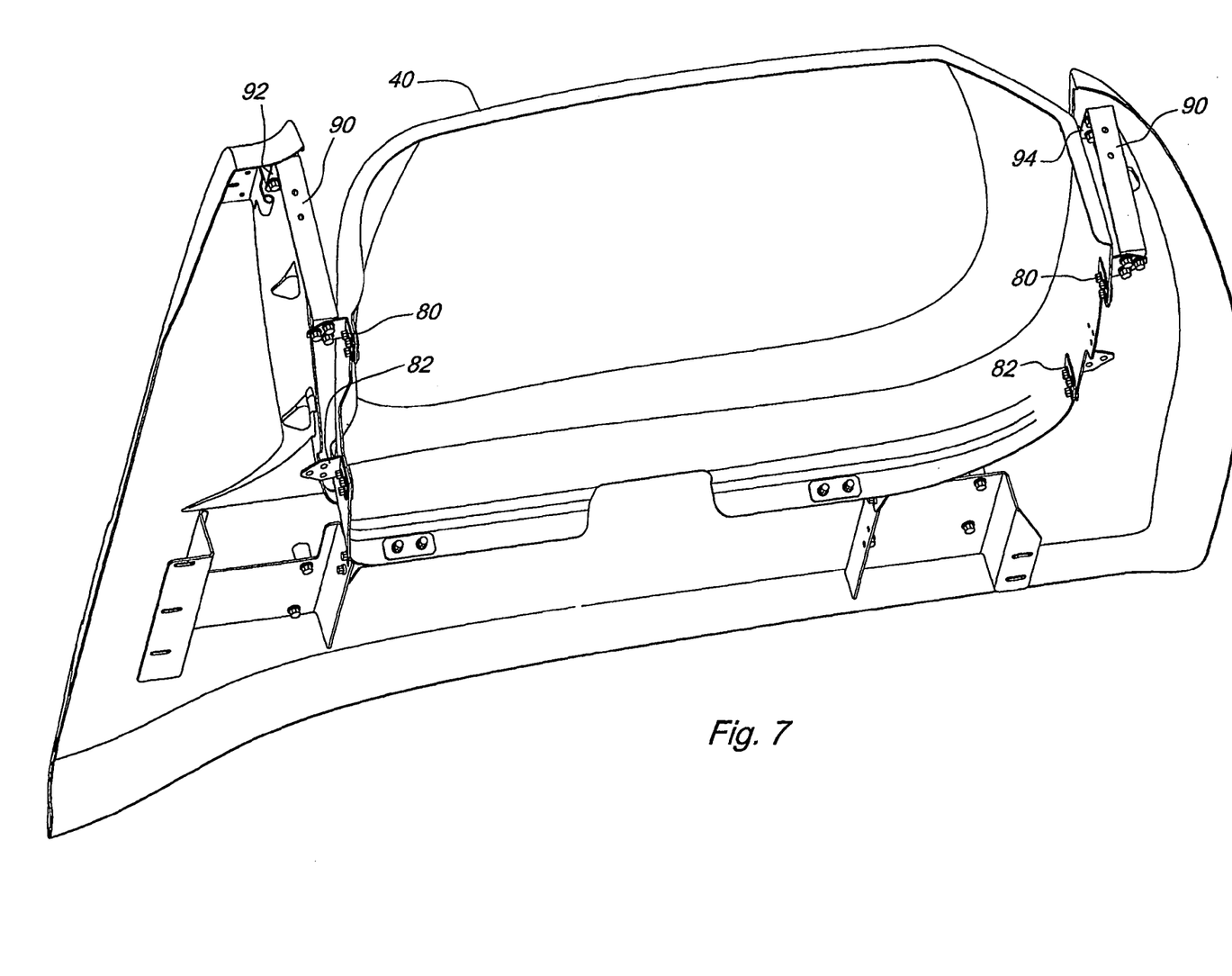
FIG. 7 is a partial top view of a combine with the air scoop folded for transport.

As shown in FIG. 7, when the air scoop 40 is in the closed, shipping position, the bosses 80,82 are detached from the radiator door panel 34. Angled shipping brackets 90 are used to secure the air scoop 40 in the closed shipping position. The shipping brackets 90 are secured at a front edge thereof to mounting brackets 92, 94 on the left and right sides of the radiator door panel 34. The bosses 80 at the upper end of the air scoop 40 are secured to the a rear side of shipping brackets 90 with securing means. This retains the air scoop 40 in the closed shipping position. In the closed position, the outside of the air scoop 40 is substantially flush with the outside surface of the radiator door panel 34, providing a narrower profile for the vehicle for shipping and transport purposes. This is particularly useful in situations where there is a narrow road or rail bed or other location through which the vehicle must be moved.

Although the invention is illustrated as being used on a rotary combine, the present invention can be used on other combine types including conventional straw walker combines and hybrid combines having transverse threshing cylinders and rotary separators.

Having described the preferred embodiment, it will become apparent that various modifications can be made without departing from the scope of the invention as defined in the accompanying claims.

The invention claimed is:

1. A working vehicle, comprising:
a vehicle body having a top;
an internal combustion engine contained in an engine compartment in the vehicle body; and
an air scoop having an inlet positioned near the top of the vehicle body to conduct ambient air from outside the vehicle into the vehicle and facing in an upward direction, the air scoop pivotable between a first closed, transport position, and a second open, operating position for directing said ambient air into the engine compartment when the air scoop is in the open, operating position.

2. The working vehicle of claim 1, further including a rotary screen positioned between the air scoop and the engine compartment in the vehicle body.

3. The working vehicle of claim 2, wherein the air scoop has a cross section approximating the width of the rotary screen.

4. The working vehicle of claim 2, wherein the air scoop has a generally L shaped flow path from the inlet to the rotary screen, directing air from a generally vertically downward direction to a generally horizontal direction.

5. The working vehicle of claim 1, wherein the air scoop has a generally semi-circular inlet and a generally U-shaped cross-section.

6. The working vehicle of claim 1, wherein the air scoop has an outer wall with a curved transition between the inlet and the cross-section.

7. An internal combustion engine assembly, comprising:
an internal combustion engine;
an engine housing at least partially enclosing said internal combustion engine; and an air scoop, the air scoop having an inlet positioned above the engine housing and facing in an upward direction, a lower portion of the air scoop positioned in fluid communication with the engine housing, the air scoop being movable between an open operating position and a closed position.

8. The internal combustion engine assembly of claim 7, wherein the air scoop has a generally L shaped flow path from the air scoop inlet to the engine housing, directing air from a generally vertically downward direction to a generally horizontal direction.

9. A method of operating a working vehicle including a vehicle body, the vehicle body at least partially enclosing an engine compartment having an internal combustion engine, the method comprising the steps of:
   drawing air through an air scoop having an inlet positioned near a top of the vehicle body to conduct ambient air from outside the vehicle into the vehicle and facing in an upward direction, the air scoop having a lower portion positioned adjacent to the engine compartment, the air scoop configured to be movable between an open operating position and a closed shipping position; and
   when the air scoop is in the open operating position, flowing the ambient air from the air scoop inlet into the engine compartment.

10. The method of operating a working vehicle of claim 9, including the step of removing debris from the air using a rotary screen positioned between the air scoop and the engine compartment.

11. The method of operating a working vehicle of claim 9, wherein the air scoop includes an outer wall covering the rotary screen in a horizontal direction, the air scoop inhibiting air flow disturbance when in a cross wind operating condition.

12. The method of operating a working vehicle of claim 9, wherein the air scoop has a generally L shaped flow path from the inlet to the engine compartment, and the step of drawing air through the air scoop includes directing air from a generally vertically downward direction to a generally horizontal direction.

13. The method of operating a working vehicle of claim 9, wherein said working vehicle comprises an agricultural combine.

14. A vehicle having an internal combustion engine with a radiator for cooling the engine, the vehicle having a radiator panel adjacent to and exterior to the radiator, the radiator door panel having an air scoop movable between a closed position for transport of the vehicle and an open position for operation of the vehicle by pivoting of the air scoop about an axis at the lower edge of the air scoop adjacent to the radiator panel, the air scoop having an inlet positioned at a top edge of the air scoop, adjacent to or above an upper edge of the vehicle, wherein the vehicle with the air scoop in the closed position has a narrower overall width than the vehicle with the air scoop in the open position.

* * * * *